US012783551B2

(12) United States Patent
Vasudevan

(10) Patent No.: US 12,783,551 B2
(45) Date of Patent: Nov. 3, 2026

(54) AUTOMATIC LABELING OF LARGE DATASETS

(71) Applicant: Microsoft Technology Licensing, LLC, Redmond, WA (US)

(72) Inventor: Sriram Vasudevan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 53 days.

(21) Appl. No.: 17/847,755

(22) Filed: Jun. 23, 2022

(65) Prior Publication Data

US 2023/0418841 A1 Dec. 28, 2023

(51) Int. Cl.

| | |
|---|---|
| ***G06F 16/28*** | (2019.01) |
| ***G06F 16/2455*** | (2019.01) |
| ***G06F 16/2457*** | (2019.01) |
| ***G06N 20/00*** | (2019.01) |

(52) U.S. Cl.

CPC ...... *G06F 16/285* (2019.01); *G06F 16/24556* (2019.01); *G06F 16/24564* (2019.01); *G06F 16/24578* (2019.01); *G06N 20/00* (2019.01)

(58) Field of Classification Search

CPC ............. G06F 16/285; G06F 16/24556; G06F 16/24578; G06F 16/24564; G06N 20/00

USPC .......................................................... 707/728

See application file for complete search history.

(56) References Cited

U.S. PATENT DOCUMENTS

2014/0330804 A1* 11/2014 Bao ..................... G06F 16/3338 707/706
2016/0196619 A1* 7/2016 Merhav ................. G06F 40/284 705/319
2020/0082112 A1* 3/2020 Altshuler ............ G06F 21/6227
2020/0137097 A1* 4/2020 Zimmermann ..... H04L 63/1425
2021/0081818 A1* 3/2021 Fahmy ................... G06N 20/00
2023/0229691 A1* 7/2023 Vinod ................... G06F 16/538 707/769
2023/0267175 A1* 8/2023 Jain ......................... G06F 18/22 706/15
2023/0297629 A1* 9/2023 Stewart ............ G06Q 10/06398 707/709

OTHER PUBLICATIONS

"Weak supervision", Retrieved From: https://web.archive.org/web/20210603045742/https://en.wikipedia.org/wiki/Weak_supervision, Jun. 3, 2021, 3 Pages.

* cited by examiner

*Primary Examiner* — Ann J Lo
(74) *Attorney, Agent, or Firm* — Cantor Colburn LLP; Renee D. Brown

(57) ABSTRACT

Methods, systems, and computer programs are presented for labeling datasets. An example method can include generating rules for labeling data records within a first dataset. The rules can indicate an extent to which a data record matches query criteria. The method can further include generating an aggregated label for the corresponding data record based on the rules and training a machine learning model using the first dataset and the aggregated label. The method can include receiving an indication of user engagement and combining the indication of user engagement with the aggregated label to generate a score.

16 Claims, 8 Drawing Sheets

AUTOMATIC LABELING OF LARGE DATASETS

TECHNICAL FIELD

The subject matter disclosed herein generally relates to methods, systems, and machine-readable storage media for automatic labeling of large datasets using heuristics and external knowledge bases.

BACKGROUND

Oftentimes, database users are presented with database information automatically within user applications. Sometimes, the information presented is not relevant to the user to the extent that user time may be wasted, and the user develops an unfavorable view of the user application. Such a situation can occur particularly in applications that provide information on employment opportunities, when the user application presents employment opportunities that are far removed from the user's interests or talents.

Systems for avoiding the presentation of irrelevant database information often rely on scores produced by machine learning models. The training data that the model is trained on can require labor-intensive means to remove irrelevant training data information and are not scalable to large sets of training data.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to providing a tool based on heuristics and machine learning to automatically label database entries so that searches or presentation of database information in a user application is more likely to be relevant to users. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, a computer-implemented method for labeling datasets includes generating, by one or more processors, a plurality of rules for labeling data records within a first dataset, the rules indicating an extent to which a corresponding data record matches one or more query criteria. The method can further include generating, by the one or more processors, an aggregated label for the corresponding data record based on the plurality of rules. The method can further include training a machine learning model using the first dataset and the aggregated label. The method can additionally include receiving an indication of user engagement and combining the indication of user engagement with the aggregated label to generate a score.

For the purposes of this description the phrases "an online social networking application" and "an online social network system" may be referred to as and used interchangeably with the phrases "an online system," "an online service," "a networked system," or merely "a connections network." It will also be noted that a connections network may be any type of an online network, such as, e.g., a professional network, an interest-based network, or any online networking system that permits users to join as registered members. For the purposes of this description, registered members of a connections network may be referred to as simply members. Further, some connections networks provide services to their members (e.g., search for jobs, search for candidates for jobs, job postings) without being a social network, and the principles presented herein may also be applied to these connection networks.

Figure 1:
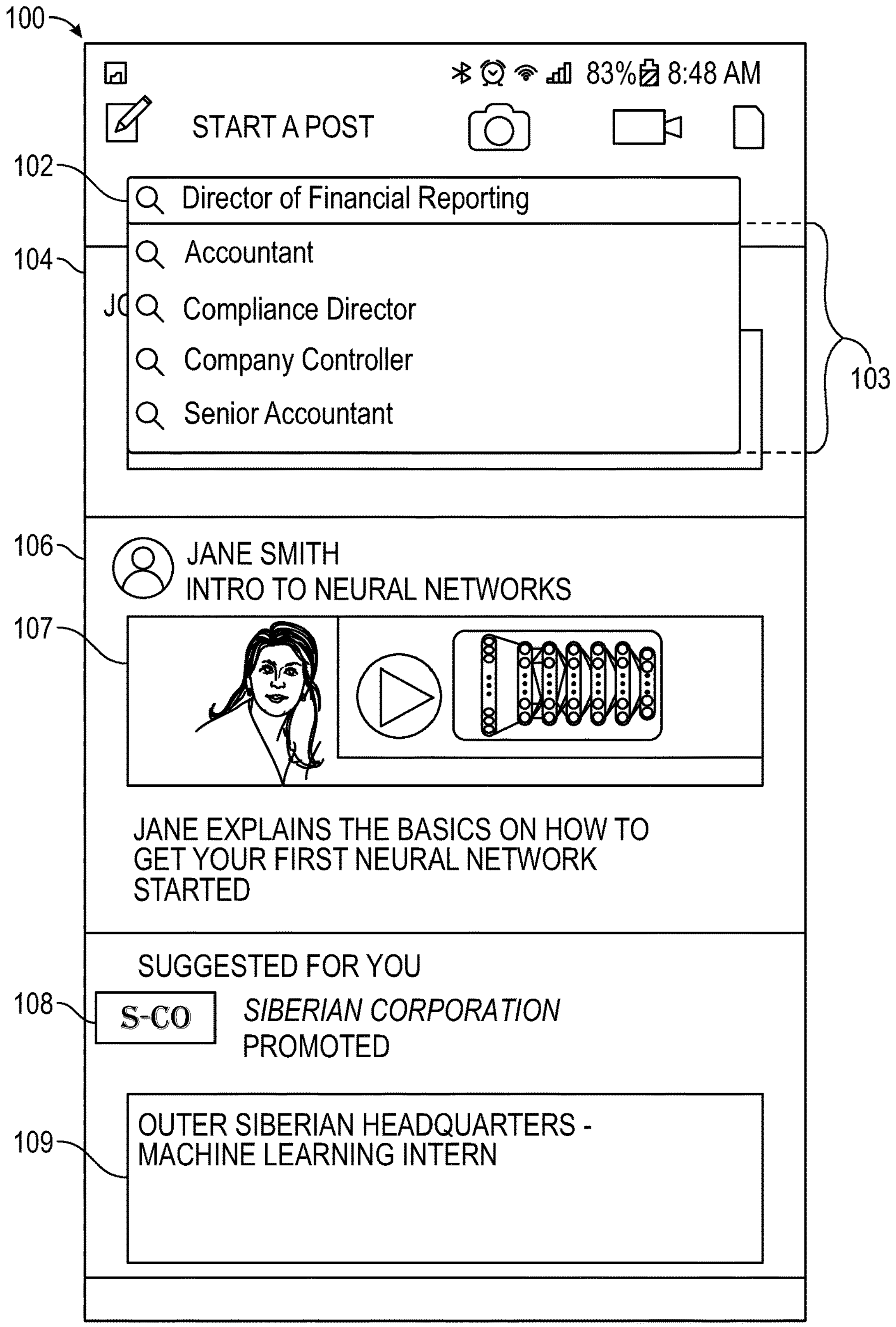
FIG. 1 is a user interface of a user feed with interactive query suggestions, according to some example embodiments.

FIG. 1 is a screenshot of a user feed 100 that includes items in different categories, according to some example embodiments. In the example embodiment of FIG. 1, the user feed 100 includes a query field 102 for entering search queries. The online service provides a list 103 of related queries derived from the query entered, or selected from a previous list of suggestions, by the user. In the illustrated example, the user has entered a search for "Director of Financial Reporting," and the online service has suggested other searches, such as "Accountant," "Compliance director," "Company controller," and "Senior Accountant."

The user feed 100 also includes different information categories, such as user posts 106, and sponsored items 108. Other embodiments may include additional categories such as news, messages, articles, etc. The user posts 106 include item 107 posted by users of the connections network (e.g., items posted by connections of the user), and may be videos, comments made on the connections network, pointers to interesting articles or webpages, etc. In the illustrated example, the item 107 includes a video submitted by a user. The user feed 100 can also include suggestions 109 for jobs, including promoted jobs or other jobs.

Although the categories are shown as separated within the user feed 100, the items from the different categories may be intermixed, and not just presented as a block. Thus, the user feed 100 may include a large number of items from each of the categories, and the online service decides the order in which these items are presented to the user based on the desired utilities. Additionally, the user may receive in-network communications from other users. The communications may originate by other users who are socially connected with the user or by unconnected users.

The user feed 100 can also include job recommendations 104 (covered by the query suggestions). However, embodiments are not limited thereto, and embodiments can include query pages or websites specific to jobs, job search interfaces, or other interfaces in which users can perform queries, whether or not these are specific to job searches. Some existing job recommendation systems may generate suggestions that do not match a user's implicit background (obtained from the user profile and job experience listings), or a user's explicit job queries. Seniority level may not match, desired job location may not match, a job may have been retrieved because a company name was mentioned in the boilerplate text of another company's job posting, etc. Providing such inaccurate results can result in poor user experience or may cause the user to have less trust in the user feed 100 and in the online system generally, or to use that online system less than he or she otherwise would have used it. Thus, a goal is to avoid presenting inappropriate suggestions, which may be referred to hereinafter as "false positives."

It can be difficult to generate a quantitative interpretation of which job suggestions or other suggestions may be inappropriate. System engineers or other groups employed by online services could manually tag data so that data can be better matched in terms of skills, location, etc. (although embodiments are not limited to job suggestions and could include any type of query or other element in a user feed 100). However, such manual labeling, while high quality, can be expensive to implement and not scalable to large datasets. Users could tag inappropriate suggestions (e.g., "false positives"), but this can be frustrating and time consuming for users, and also is not scalable.

Instead of systems using high levels of human user interaction, weak supervision can be used to tag data. Weak supervision is a technique in which noisy, limited, or imprecise sources are leveraged to act as a weak signal in a supervised learning setting. This approach alleviates the burden of obtaining manually-labeled data sets, which can be costly or impractical. Instead, inexpensive weak labels are employed with the understanding that they are imperfect but can nonetheless be used to create a strong predictive model. Weak supervision techniques can be used where there is an insufficient quantity of labeled data, insufficient subject-matter expertise to label data, or insufficient time to label and prepare data. Weak supervision can be heuristic-based where labels are imprecise. External knowledge bases or alternate datasets can also be used to tag data.

Figure 2:
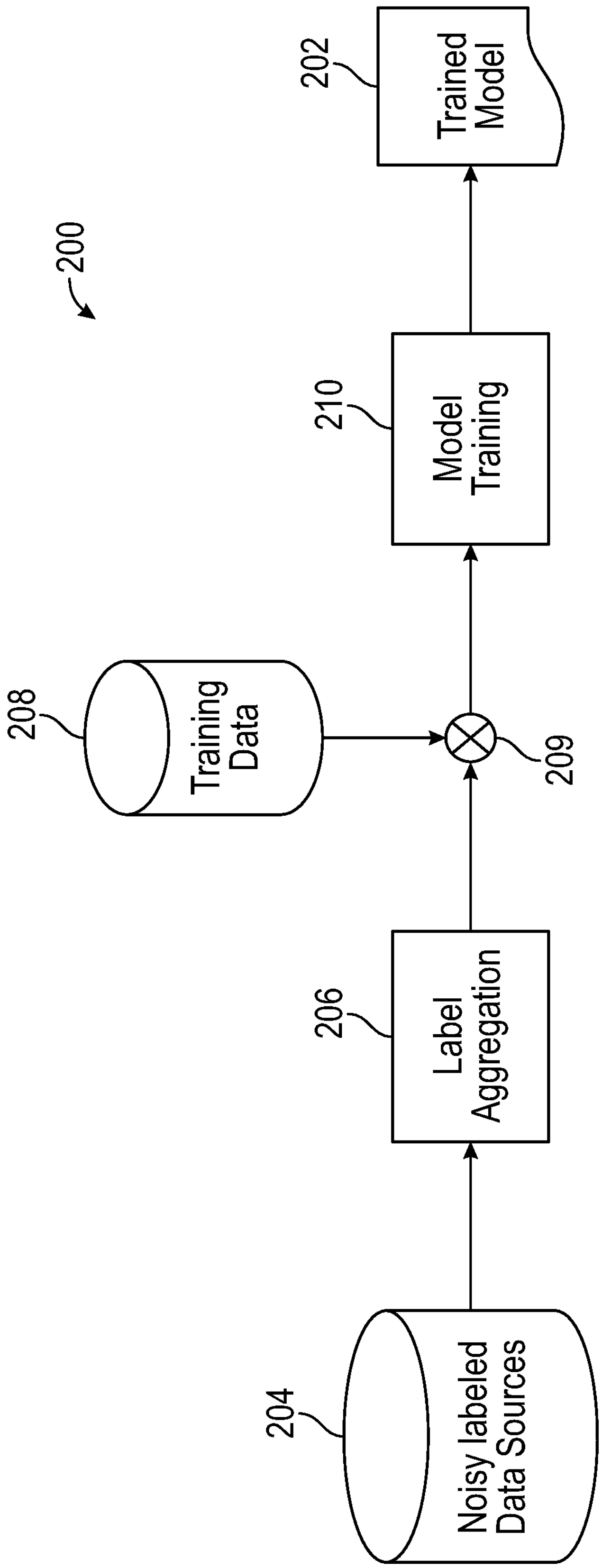
FIG. 2 is a high level-level block diagram of a system for providing a model according to some example embodiments.

FIG. 2 is a high level-level block diagram of a system 200 for providing a recommendation model 202 according to some example embodiments. The system 200 can estimate which results, e.g., job recommendations, are false positives in an efficient, scalable manner using heuristics (or rules) as noisy labeled data sources 204. Outputs of the heuristics are aggregated at block 206 into a single value P(label) that takes into account the accuracy of each noisy label and the value that each noisy label assigns. The probabilities found in P can be used as-is or converted to labels and joined with the training data 208 at block 209, and any inaccuracies and coverage are adjusted—for using equations and methods described later herein.

Training data 208 can be labeled using labeling functions (LFs) in the form of heuristics, or rules, that are designed using the expertise of the online system's design engineers, as described in more detail later herein. For example, a job searching online system can provide weak labels that can efficiently cover job search datasets and that provide a numeric value that indicate how appropriate a job is for a given user. The predicted weak labels are used in downstream models accounting for any possible accuracy and coverage parameters, information, and concerns. For example, the weak labels can be used as part of model training 210, in which the weak label is combined with other objectives (e.g., the possibility that the user might request more details on the job, apply to the job, get hired for the job, etc.). The model can also use the weak label in conjunction with details including user skills, skills required by the job, etc. in an overall solution before presenting a job posting to a user.

Example heuristics or rules for job search or job posting systems can be based on different aspects of a job posting, such as relevant occupation or seniority level. Other rules could be used for other sorts of online systems, and other rules can be used for job search or job posting systems. For example, rules can also include company-based queries in matches that are only returned if an exact company name is matched, or rules in which jobs from the same company are not returned (e.g., to prevent a user from accidently applying to their own current employer). The above are merely examples and embodiments are not limited thereto.

Using knowledge bases, or taxonomies, systems and methods according to embodiments can be used to generate rules to act as subject matter experts in labeling query results, e.g., job results, and the labels can be used to decide whether to present different results to a user. Systems and methods according to embodiments can prevent, for example, internship jobs being presented to a senior vice president.

Once the heuristics or LFs are generated, they are used to indicate whether a given user can be paired with a job (or other query result) in a way that makes sense for that user by combining the heuristic-derived labels into a single, relatively reliable label. In other words, the heuristics or LFs can determine whether a job or other result is a "good fit" for that user (or for a query by that user or any other user) or whether instead the job result would be a "false positive." Many such heuristics or LFs can be used to generate weak labels that are used in training models as described in more detail later herein to generate final, robust labels.

In some embodiments, a small seed of precise labels (e.g., "golden dataset") can be generated, and a model developed that can aggregate all or a large subset of rules using the seed, into a final single label. In some embodiments, each LF can output a value as described later herein.

Figure 3:
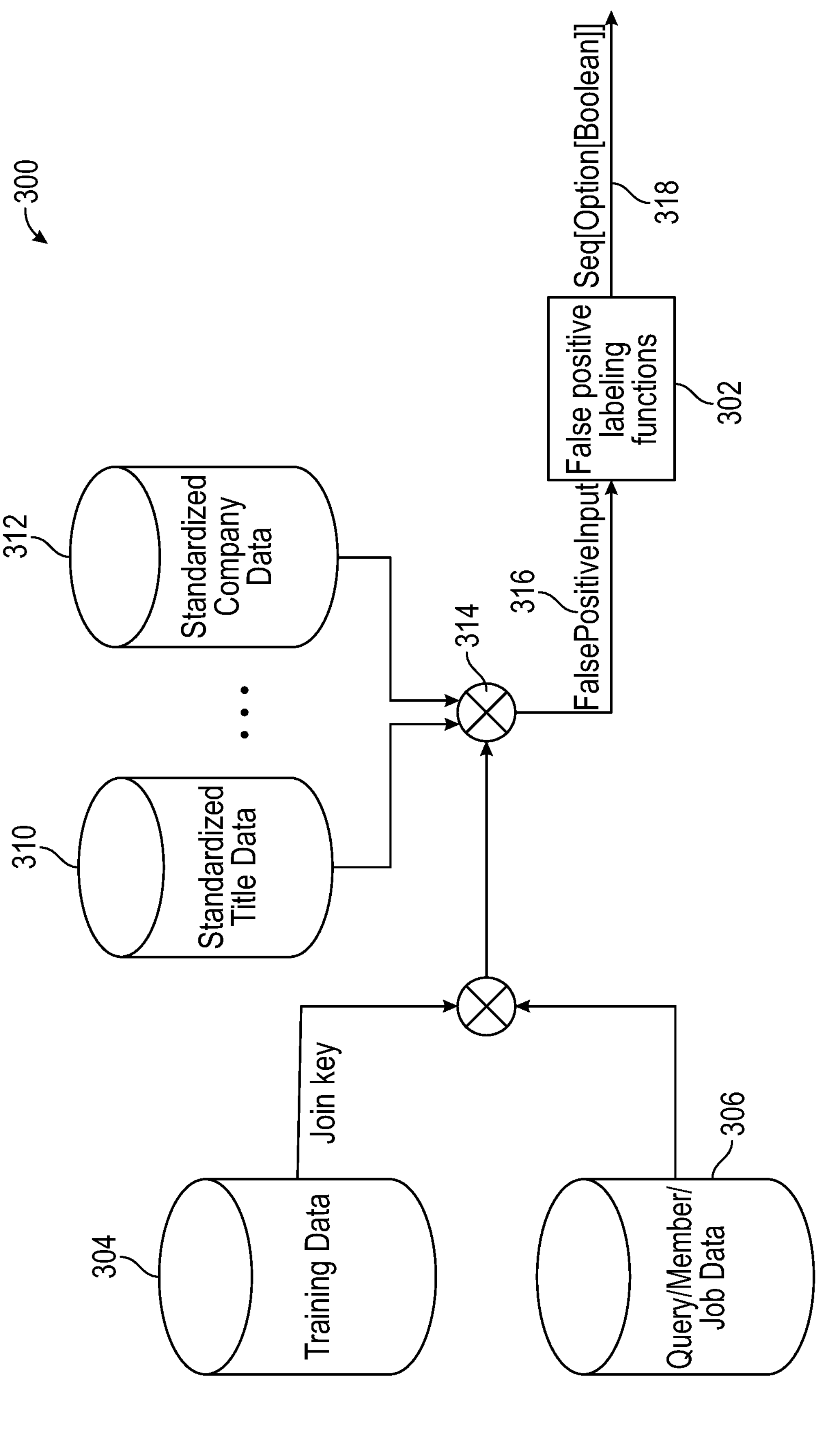
FIG. 3 is a high level block diagram of an architecture for labeling false positives according to some example embodiments.

FIG. 3 is a high level block diagram of an architecture 300 for labeling false positives according to some example embodiments. The embodiment shown in FIG. 3 is for an example use case directed to job searches, but embodiments are not limited to job searches and can be used for any query system returning results to a user.

Domain expertise, heuristics, and external data sources can all be used in some embodiments to develop rules, or labeling functions (LFs) 302. LFs 302 can output a binary value or choose to abstain. More generally, the LFs could also output an enumeration, or a probabilistic estimate. Each LF is treated as a separate "voter" as to whether a given result is a false positive, and the reliability of each LF is modeled as described later herein.

Each LF has the definition (FalsePositiveInput=>Option [Boolean]), where FalsePositiveInput has the following schema:

$$FalsePositiveInput\,(joinKey,\ queryMemberJobDetails) \tag{1}$$

and the LF in at least this embodiment can return "true" if the query result is a false positive (e.g., not a good match), "false" if the query result is not a false positive (e.g., the query result is a good match) or abstain if there is not enough information to make a decision. In the case of a job search, one schema for FalsePositiveInput can include:

```
case class FalsePositiveInput(                                    (2)
queryId: String, // Search query ID - hashed value as string
jobId: Long,
querySegments: Seq[QuerySegment],
jobDetails: JobDetails)
```

For each (query, job) pair, the query Segments can include details of each query segment and jobDetails can include information about the job. These fields can contain information (including any joined data sources) needed to compute whether a job is a false positive. New data sources can be added as it becomes available or as existing data is shown to be insufficient to compute a certain False Positive LF. Other details such as member identification, memory details, and other fields can be added to schema (2).

Referring still to FIG. 3, given a job search use case the training data 304 is joined with query/member/job database 306, which includes job searches, standardized job data and job details. Details for only those queries and jobs present in the training data 304 are selected. Each query segment is joined with standardized title data source 310 and standardized company data source 312 at join 314. The standardized jobs data is augmented in a similar manner, joining in data such as supertitle, occupation, function, company name, company, description, industry etc. The augmented query and jobs datasets are matched up using the (query ID, job ID) information from the training data 304, to prepare the final FalsePositiveInput dataset 316. The FalsePositive LFs are applied at 302 and LF outputs 318 as described above are generated.

Next, systems methods and apparatuses according to some embodiments can aggregate the labels output at 318 according to various aggregation methodologies, to generate an aggregated label. A label aggregation function $f$ can be given by:

$$f{:}A^n \to B \tag{3}$$

where A is the set of possible LF outputs. In some examples, all the LFs can be OR'd together, all the LFs can be summed together and given weights, or a weighted majority vote can be applied to all LFs to aggregate the LFs.

Given n heuristic-derived labels, and given m LFs, $Z_1 \ldots Z_m$ that can output "true," "false," and "abstain" (for example), a single stable and reliable label is added to indicate whether a given result is a false positive. Embodiments provide a Bayesian approach to model the various outputs of the LFs. This Bayesian model accounts for the true positive (TP), FP, TN and FN rates of the labeling functions, and also how likely they are to abstain when the ground truth label is true or false. Equation (4) illustrates a weighted majority approach to aggregating LF inputs:

$$w = \Sigma_{i\in\{i:Z_i=True\}}\log\left(\frac{TP_i}{FP_i}\right) + \Sigma_{j\in\{j:Z_j=Flase\}}\log\left(\frac{FN_j}{TN_j}\right) + \tag{4}$$

-continued $$\Sigma_{k\in\{k:Z_k=Null\}}\log\left(\frac{nullP_k}{nullN_k}\right) + (1-m)\cdot\log\left(\frac{P}{N}\right)$$

i, j, k represent different labeling functions; P=TP+FN+nullP, where TP represents number of true positives (e.g., where a result has been correctly labeled as a false positive), FN represents the number of false negatives (e.g., where a result has been incorrectly labeled as not a false positive), nullP represents the number of "abstains" when the golden dataset was positive, N=FP+TN+nullN wherein FP represents the number of false positives (e.g., where a result has been incorrectly labeled as a false positive, TN represents the number of true negatives (e.g., where a result has been correctly labeled as not being a false positive), and nullN represents the number of "abstains" when the golden dataset was negative.

The term $$\Sigma_{i\in\{i:Z_i=True\}}\log\left(\frac{TP_i}{FP_i}\right)$$

represents a sum of all true positives and false positives over all the labels, where log $$\left(\frac{TP_i}{FP_i}\right)$$

represents a measure or now correct the labeling function is with respect to positives. Likewise, the term $$\Sigma_{j\in\{j:Z_j=Flase\}}\log\left(\frac{FN_i}{TN_i}\right)$$

represents the sum of all false negatives and true negatives over all the labels, and log $$\left(\frac{FN_i}{TN_i}\right)$$

represents a measure of how correct the labeling function is with respect to negatives. The term $$\Sigma_{k\in\{k:Z_k=Null\}}\log\left(\frac{nullP_k}{nullN_k}\right)$$

represents the sum of all abstentions over all the labels, and $$\log\left(\frac{nullP_k}{nullN_k}\right)$$

represents a measure or now correct the labeling function is with respect to abstentions. The term $$(1-m)\cdot\log\left(\frac{P}{N}\right)$$

represents how imbalanced the golden dataset is.

The probability that a false positive is correct, or pFalsePositive, can be given by:

$$pFalsePositive = \frac{1}{1+\exp(-w)} \tag{5}$$

An output of a system according to embodiments can be used to predict whether a given query result is a false positive or not, and therefore whether to present the result to a user. A threshold can be set on the pFalsePositive value, such that all records that exceed that threshold are labeled as false positive. This would comprise a "hard classifier" approach and might not take full advantage of false positive estimates provided in example embodiments. Alternatively, in other embodiments, the probabilities themselves can be used according to (6):

$$new_{loss} = pFalsePositive * falsepositive_{loss} + (1 - pFalsePositive) * \text{old\_loss}$$

In some current systems, when a user applies to job presented to the user, that can be understood as not being a false positive result (e.g., "false"). On the other hand, if a user dismisses a result, that can be understood as a false positive result (e.g., "true"). However, in example aspects, the apply/dismiss model is refined by making use of probability distributions, other heuristics from other databases, or other metrics such as user experience-based metrics.

Instead of using Equation (6) above, Equation (7) can be used to directly model rewards and penalties:

$$(a * \text{user\_engagement} + b * \text{jh\_reward}) * (1 - pFalsePositive) + c * \text{fp\_reward} * pFalsePositive \tag{7}$$

According to (7), if a job was a false positive, the job is assigned a reward or penalty accordingly. If the job was not a false positive, then a different reward or penalty is applied. The values for user engagement and confirmed hire rewards (user_engagement and jh_reward, respectively) can be assigned, and false positive rewards can be assigned, based on results of experiments using training data.

In some experiments according to example embodiments, a model can be trained with fp_reward (or the reward/penalty for a false positive) set to zero. Other models can also be executed having different values for fp_reward. The model that performs best, e.g., has the most user engagement, other online metric or other parameter, can be chosen and the corresponding fp_reward value for the best model can be selected. The values a and b give more importance to user-facing objectives such as user engagement and confirmed hires, and value c gives more value to having fewer false positives. The values a, b, and c can be experimented with to choose the values that perform best online.

Figure 4:
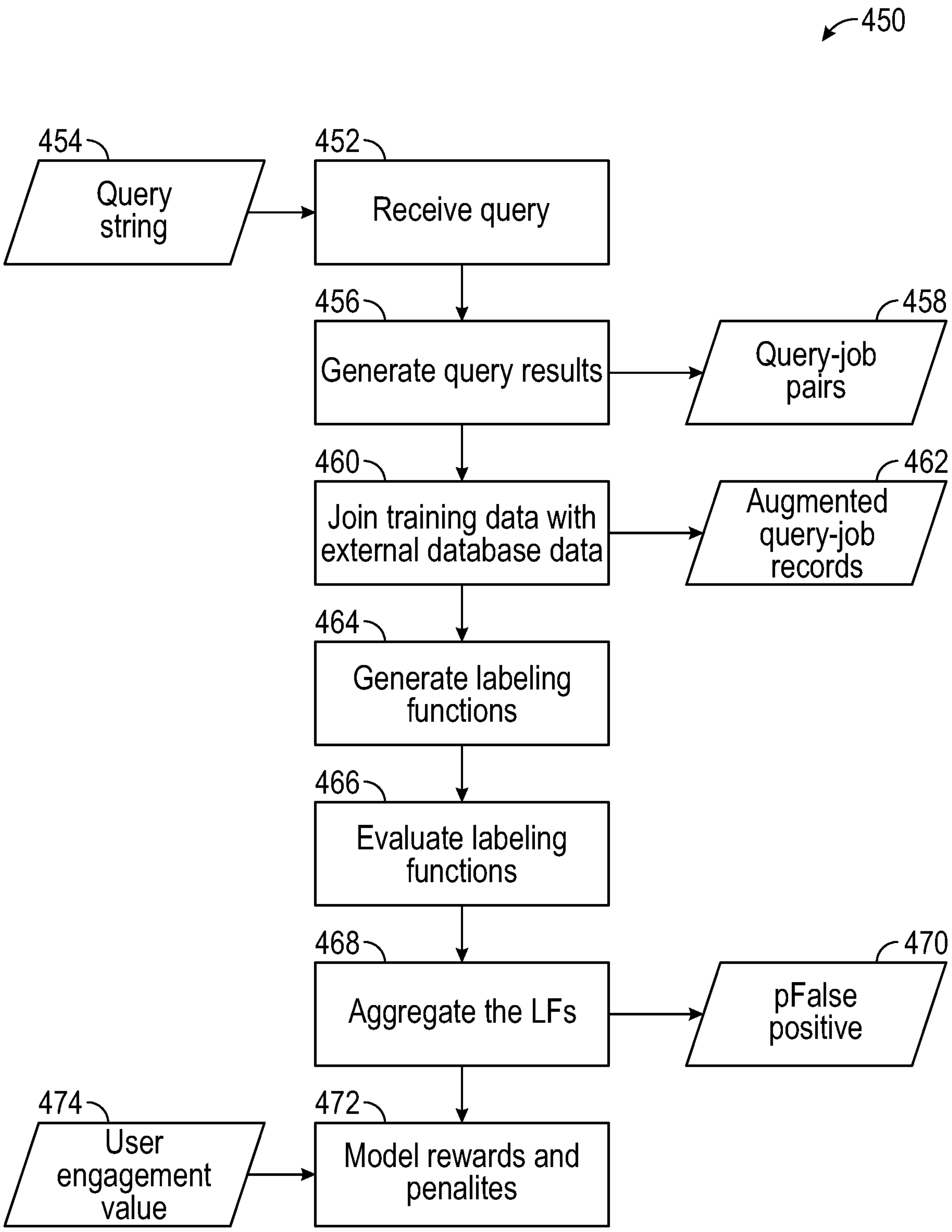
FIG. 4 is a flowchart illustrating a method of using an architecture for labeling false positives according to some example embodiments.

FIG. 4 is a flowchart illustrating a method 450 of using an architecture 300 (FIG. 3) for labeling false positives and providing improved recommendations according to some example embodiments.

Figure 7:
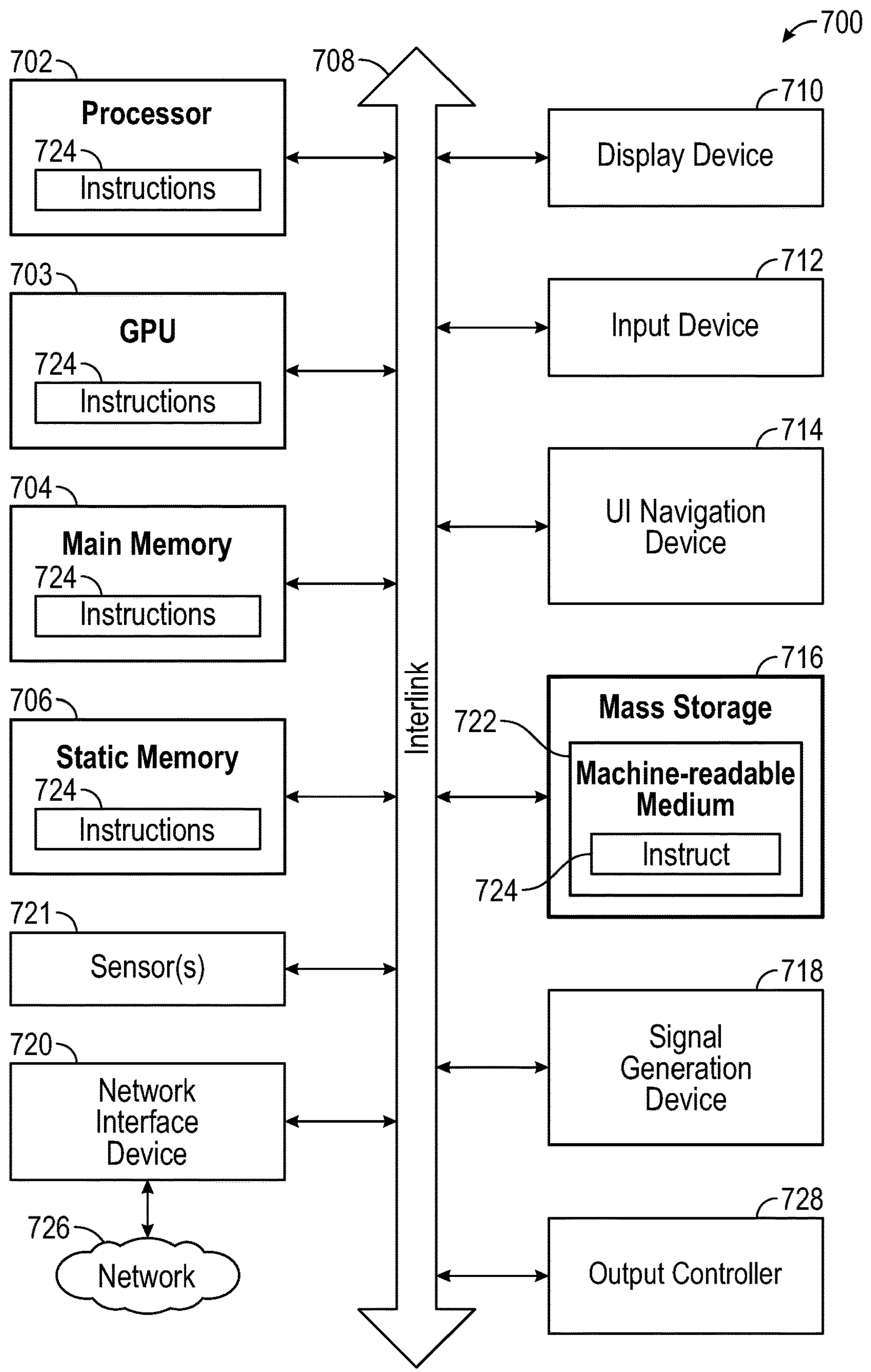
FIG. 7 is a block diagram illustrating an example of a machine upon or by which one or more example process embodiments described herein may be implemented or controlled.

In operation 452, a user enters a query that is received at a user interface device (e.g., input device 712 (FIG. 7). By way of illustration, assume the user enters a query for "senior software engineer Company A" as shown at 454.

In operation 456, results can be produced from the query of operation 452. Assume that three results are generated from the query: "Senior Software Engineer Company A," "Staff software engineer company B," and "aviation engineer Company C." Based on Schema (2) described earlier herein, this provides three query job pairs 458.

In operation 460, the query job pairs can be joined with standardized title data of external database 310 (FIG. 3) that are augmented by joining training data 304 (FIG. 3) with external database records from external databases 306, 310, and 312 (FIG. 3). The training data 304 can further be joined with structured job data from external database 306 and with standardized company data from external database 312. This can generate, for example, three augmented query job records 462, which define fields for the user query and for the jobs returned by the system:

1. queryId: 123, querySegments: [(keyword: "senior software engineer", type: "title", seniority: 2, titleId: 9, function: "engineering"), (keyword: "Company A", type: "company", industry: "technology")], jobId: 456, jobTitle: "senior software engineer", jobSeniority: 2, jobTitleId: 9, jobFunction: "engineering", jobCompany: "company A"
2. queryId: 123, querySegments: [(keyword: "senior software engineer", type: "title", seniority: 2, titleId: 9, function: "engineering"), (keyword: "Company A", type: "company", industry: "technology")], jobId: 789, jobTitle: "staff software engineer", jobSeniority: 3, jobTitleId: 9, jobFunction: UNKNOWN, jobCompany: "Company B"

queryId: 123, query Segments: [(keyword: "senior software engineer", type: "title", seniority: 2, titleId: 9, function: "engineering"), (keyword: "Company A", type: "company", industry: "technology")], jobId: 147, jobTitle: "aviation engineer", jobSeniority: UNKNOWN, jobTitleId: 24, jobFunction: "engineering", jobCompany: "Company C"

assuming in the illustrated example that UNKNOWN entries are provided based on missing data from external databases regarding seniority for the second augmented query job record and regarding job function information for the third augmented query-job record.

In operation 464, LFs are generated, where each LF has a definition as described above in schema (1). In the illustrated example, at least 4 LFs are generated, although embodiments are not limited thereto:

LF 1: The difference between job seniority and query seniority is greater than 1

LF 2: The job company doesn't match the query company

LF 3: The job function doesn't match the query function

LF 4: The job title ID doesn't match the company title ID

In operation 466 each labeling function is evaluated against each query-job record 462 to determine if the corresponding record would return a false positive for each LF. As mentioned earlier herein, each LF can return "True" (the record is a false positive, e.g., would not be appropriate based on the query 452), "False" (e.g., the record would be appropriate for the user based on the query) or NULL if a decision could not be made. However, other values are possible. For example, LFs can return an enumeration (e.g., a list of possible integer values) or other values. In the currently-described example, query job records 1-3 can return LF results as shown in the below table:

| | LF1 | LF2 | LF3 | LF4 |
|---|---|---|---|---|
| Record 1 | False | False | False | False |
| Record 2 | False | True | NULL | False |
| Record 3 | NULL | True | False | True |

Next, in operation 468, the LFs are aggregated as described above in Equations (3)-(5) to generate a probability pFalsePositive 470 that a job is a false positive (e.g., result of Equation (5)). Example values for this probability can be given as:

Record 1: pFalsePositive=0.01

Record 2: pFalsePositive=0.7

Record 3: pFalsePositive=0.99

In the above example, Record 1 is probably not a false positive, meaning that Record 1 is likely a good match based on the query and/or the user performing the query. Conversely, Record 3 is likely not a good match based on the query, i.e., Record 3 has a high likelihood of being a false positive. Record 2 is somewhere between the two values of Record 1 and Record 2 and may be a false positive.

In operation 472, the system models rewards and penalties according to Equation (7). For example, if a user applies to a job, user engagement values 474 can be set relatively high. If a user merely views a job but does not apply, user engagement values can be set lower than if the user applied to the job. Finally, if the user completely skipped viewing a job, the user engagement can be set still lower. The rewards and penalties modeled according to Equation (7) can provide an improved estimate of query job relevance such that false positives can be reduced or eliminated, providing for an improved user experience.

Figure 5:
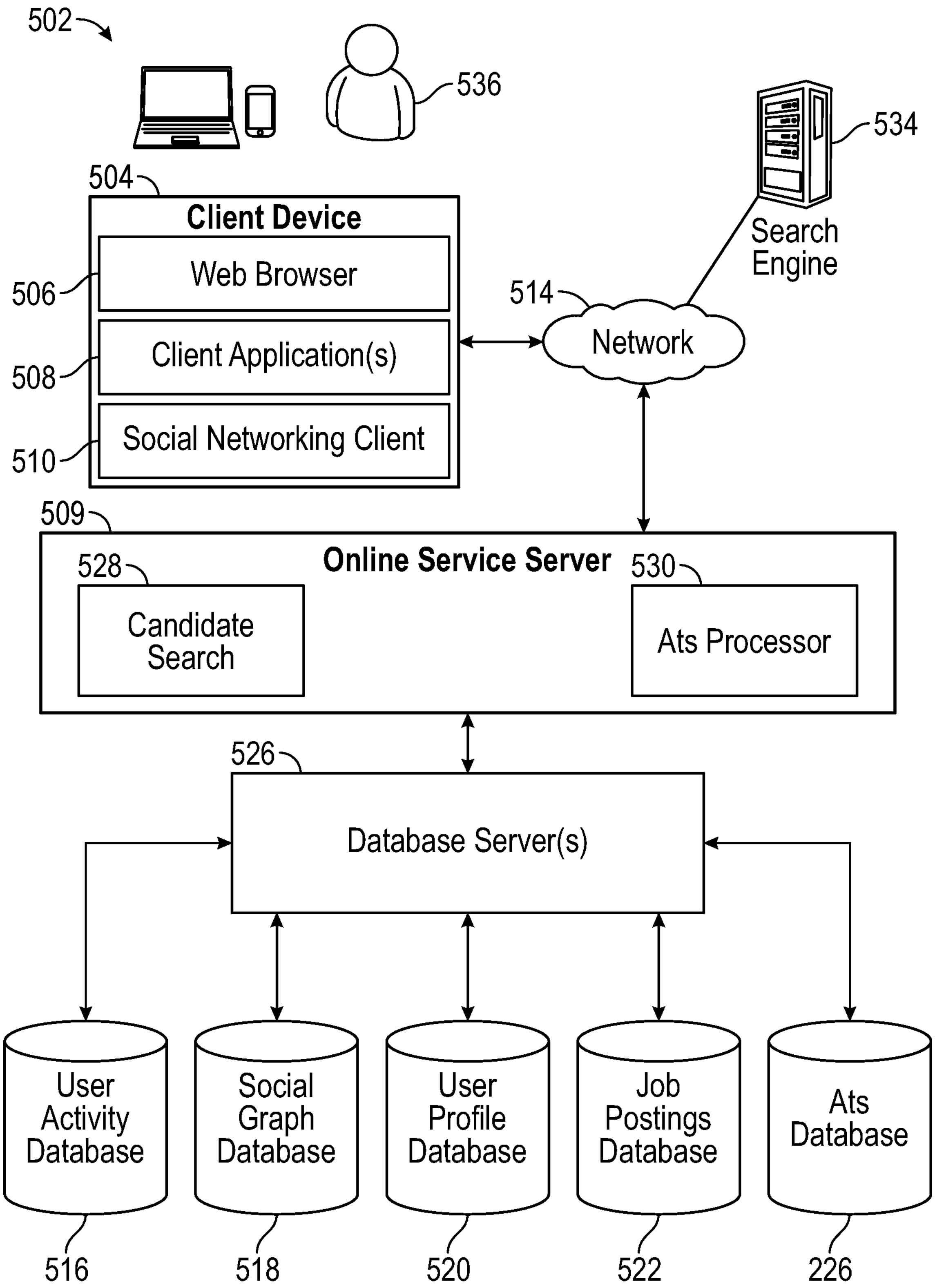
FIG. 5 is a high-level block diagram of a networked system illustrating an example embodiment of a client-server-based network architecture.

FIG. 5 is a high-level block diagram of a networked system illustrating an example embodiment of a client-server-based network architecture 502. Embodiments are presented with reference to an online service, and, in some example embodiments, the online service is a social networking service.

An online service server 509 provides server-side functionality via a network 514 (e.g., the Internet or a wide area network (WAN)) to one or more client devices 504. FIG. 5 illustrates, for example, a web browser 506, client application(s) 508, and a social networking client 510 executing on a client device 504. The online service server 509 is further communicatively coupled with one or more database servers 526 that provide access to one or more databases 516-522 and 226.

The online service server 509 includes, among other modules, a candidate search module 528 and an ATS processor 530. The candidate search module 528 performs searches for possible candidates for a job posting, including searches for online service members and ATS candidates. The ATS processor 530 handlers ATS operations, such as providing an API to import data and a UI for performing ATS-related operations within the online service.

The client device 504 may comprise, but is not limited to, a mobile phone, a desktop computer, a laptop, a tablet, a netbook, a multi-processor system, a microprocessor-based or programmable consumer electronic system, or any other communication device that a user 536 may utilize to access the online service server 509. In some embodiments, the client device 504 may comprise a display module (not shown) to display information (e.g., in the form of user interfaces).

In one embodiment, the online service server 509 is a network-based appliance that responds to initialization requests or search queries from the client device 504. One or more users 536 may be a person, a machine, or other means of interacting with the client device 504. In various embodiments, the user 536 interacts with the network architecture 502 via the client device 504 or another means.

The client device 504 may include one or more applications (also referred to as "apps") such as, but not limited to, the web browser 506, the social networking client 510, and other client applications 508, such as a messaging application, an electronic mail (email) application, a news application, and the like. In some embodiments, if the social networking client 510 is present in the client device 504, then the social networking client 510 is configured to locally provide the user interface for the application and to communicate with the online service server 509, on an as-needed basis, for data and/or processing capabilities not locally available (e.g., to access a user profile, to authenticate a user 536, to identify or locate other connected users 536, etc.). Conversely, if the social networking client 510 is not included in the client device 504, the client device 504 may use the web browser 506 to access the online service server 509.

In addition to the client device 504, the online service server 509 communicates with the one or more database servers 526 and databases 516-522 and 226. In one example embodiment, the online service server 509 is communicatively coupled to a user activity database 516, a social graph database 518, a user profile database 520, a job postings database 522, and the ATS database 226. The databases 516-522 and 226 may be implemented as one or more types of databases including, but not limited to, a hierarchical database, a relational database, an object-oriented database, one or more flat files, or combinations thereof.

The user profile database 520 stores user profile information about users 536 who have registered with the online service server 509. With regard to the user profile database 520, the user 536 may be an individual person or an organization, such as a company, a corporation, a nonprofit organization, an educational institution, or other such organizations.

In some example embodiments, when a user 536 initially registers to become a user 536 of the social networking service provided by the online service server 509, the user 536 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the user profile database 520. Similarly, when a representative of an organization initially registers the organization with the social networking service provided by the online service server 509, the representative may be prompted to provide certain information about the organization, such as a company industry.

As users 536 interact with the social networking service provided by the online service server 509, the online service server 509 is configured to monitor these interactions. Examples of interactions include, but are not limited to, commenting on posts entered by other users 536, viewing user profiles, editing or viewing a user 536's own profile, sharing content outside of the social networking service (e.g., an article provided by an entity other than the online service server 509), updating a current status, posting content for other users 536 to view and comment on, posting job suggestions for the users 536, searching job postings, and other such interactions. In one embodiment, records of these interactions are stored in the user activity database 516, which associates interactions made by a user 536 with his or her user profile stored in the user profile database 520.

The job postings database 522 includes job postings offered by companies. Each job posting includes job-related information such as any combination of employer, job title, job description, requirements for the job posting, salary and benefits, geographic location, one or more job skills desired, day the job posting was posted, relocation benefits, and the like.

While the database servers 526 is illustrated as a single block, one of ordinary skill in the art will recognize that the database server 526 may include one or more such servers.

The network architecture 502 may also include a search engine 534.

Although only one search engine 534 is depicted, the network architecture 502 may include multiple search engines 534. Thus, the online service server 509 may retrieve search results (and, potentially, other data) from multiple search engines 534. The search engine 534 may be a third-party search engine.

Figure 6:
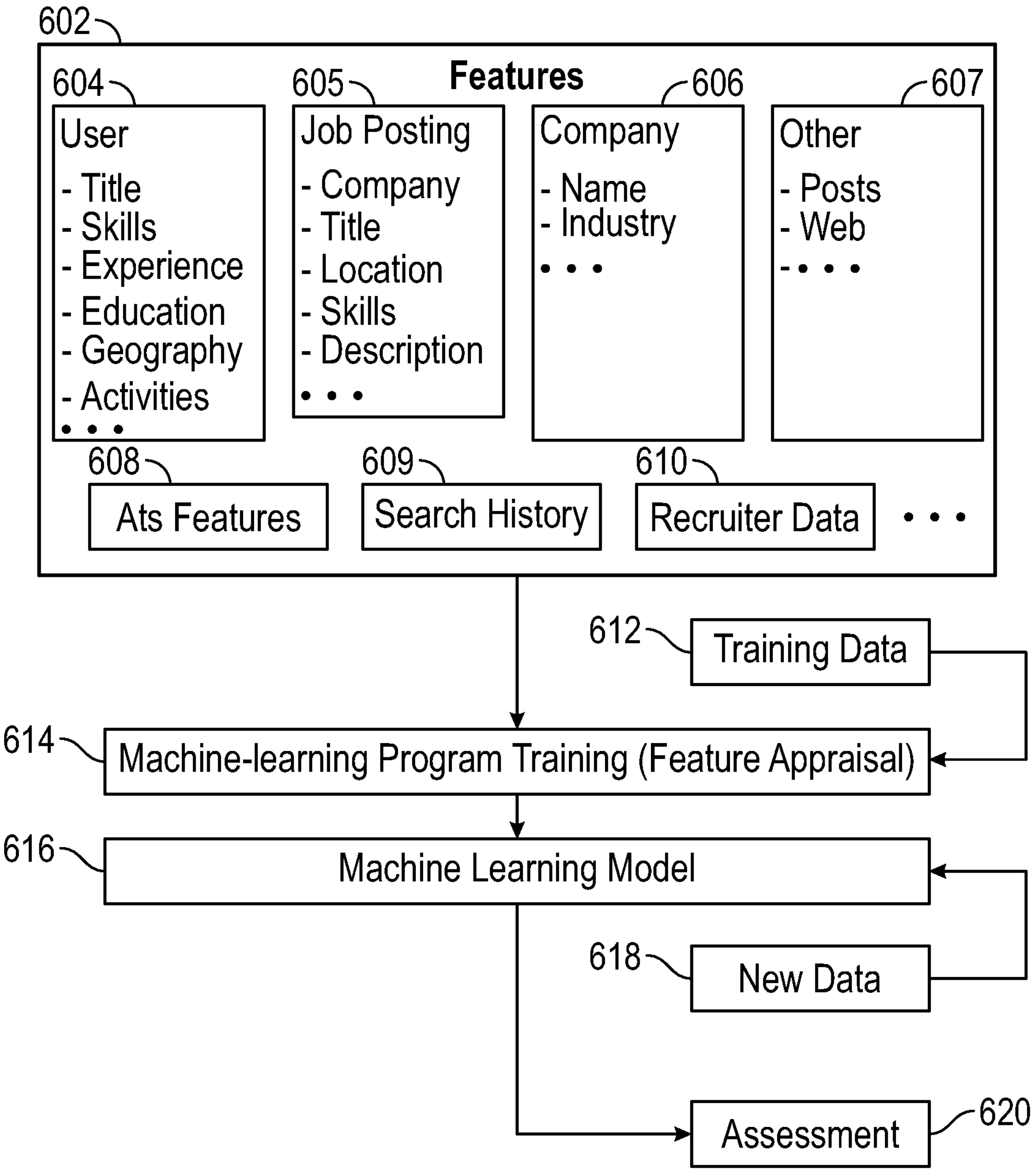
FIG. 6 illustrates the training and use of a machine-learning program, according to some example embodiments.

FIG. 6 illustrates the training and use of a machine-learning program, according to some example embodiments. In some example embodiments, machine-learning programs (MLP), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 612 in order to make data-driven predictions or decisions expressed as outputs or assessments 620. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), deep neural networks (DNN), matrix factorization, and Support Vector Machines (SVM) tools may be used for classifying or scoring job postings.

Three common types of problems in machine learning are classification problems, regression problems, and ranking algorithms. Classification problems, also referred to as categorization problems, aim at classifying items into one of several category values (for example, is this object an apple or an orange?). Regression algorithms aim at quantifying some items (for example, by providing a value that is a real number). Ranking algorithms use training data that consists of lists of items with some order specified between items in each list. The order can be determined by giving a numerical score or binary judgement (e.g., "relevant" or "not relevant") for each item. The machine-learning algorithms utilize the training data 612 to find correlations among identified features 602 that affect the outcome.

The machine-learning algorithms utilize features 602 for analyzing the data to generate assessments 620. A feature 602 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as categorical, numeric, strings, and graphs. A categorical feature is a feature that may be assigned a value from a plurality of predetermined possible values (e.g., this animal is a dog, a cat, or a bird).

In one example embodiment, the features 602 may be of different types and may include one or more of user features 604, job-posting features 605, company features 606, other features 607 (e.g., user posts, web activity, followed companies, etc.), ATS features 608 (features derived from the imported ATS data such as name, title, email address, phone number, etc.), search history 609, and recruiter data 610 (e.g., job openings, job applications, InMails).

The user features 604 include user profile information, such as title, skills, experience, education, geography, activities of the user in the online service, etc. The job posting features 605 include information about job postings, such as company offering the job, title of the job post, location of the job post, skills required, description of the job, etc. Further, the company features 606 include information about the company posting the job, such as name of the company, industry, revenue information, locations, etc. The user features used for the different relevance models may use different sets of features based on what data is available for the given domain.

The ML algorithms utilize the training data 612 to find correlations among the identified features 602 that affect the outcome or assessment 620. In some example embodiments, the training data 612 includes known data, obtained from past activities of recruiters and members in the online system, such as user responses to requests from recruiters, job applications, job openings, saved candidates by recruiters, etc.

With the training data 612 and the identified features 602, the ML algorithm is trained at operation 614. The ML training appraises the value of the features 602 as they correlate to the training data 612. The result of the training is the ML model 616.

When the acceptance ML model 616 is used to perform an assessment, new data 618 is provided as an input to the acceptance ML model 616, and the acceptance ML model 616 generates the assessment 620 as output. For example, the acceptance ML model 616 may be used to obtain the relevance (e.g., score of a member) for a given search. Different ML models 616 may be used for obtaining the relevance score of online service members and ATS candidates. Such systems can also be used to derive posts for member-facing systems such as job posts, posts made by a user's connections, relevant news articles, etc.

FIG. 7 is a block diagram illustrating an example of a machine 700 upon or by which one or more example process embodiments described herein may be implemented or controlled. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in a peer-to-peer (P2P) (or other distributed) network environment. Further, while only a single machine 700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 700 may include a hardware processor 702 (e.g., a central processing unit (CPU), a hardware processor core, or any combination thereof), a graphics processing unit (GPU) 703, a main memory 704, and a static memory 706, some or all of which may communicate with each other via an interlink 708 (e.g., bus). The machine 700 may further include a display device 710, an alphanumeric input device 712 (e.g., a keyboard), and a user interface (UI) navigation device 714 (e.g., a mouse). In an example, the display device 710, alphanumeric input device 712, and UI navigation device 714 may be a touch screen display. The machine 700 may additionally include a mass storage device (e.g., drive unit) 716, a signal generation device 718 (e.g., a speaker), a network interface device 720, and one or more sensors 721, such as a Global Positioning System (GPS) sensor, compass, accelerometer, or another sensor. The machine 700 may include an output controller 728, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, within the hardware processor 702, or within the GPU 703 during execution thereof by the machine 700. In an example, one or any combination of the hardware processor 702, the GPU 703, the main memory 704, the static memory 706, or the mass storage device 716 may constitute machine-readable media.

While the machine-readable medium 722 is illustrated as a single medium, the term "machine-readable medium" may include a single medium, or multiple media, (e.g., a centralized or distributed database, and/or associated caches and servers) configured to store the one or more instructions 724.

The term "machine-readable medium" may include any medium that is capable of storing, encoding, or carrying instructions 724 for execution by the machine 700 and that cause the machine 700 to perform any one or more of the techniques of the present disclosure, or that is capable of storing, encoding, or carrying data structures used by or associated with such instructions 724. Non-limiting machine-readable medium examples may include solid-state memories, and optical and magnetic media. In an example, a massed machine-readable medium comprises a machine-readable medium 722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720.

Figure 8:
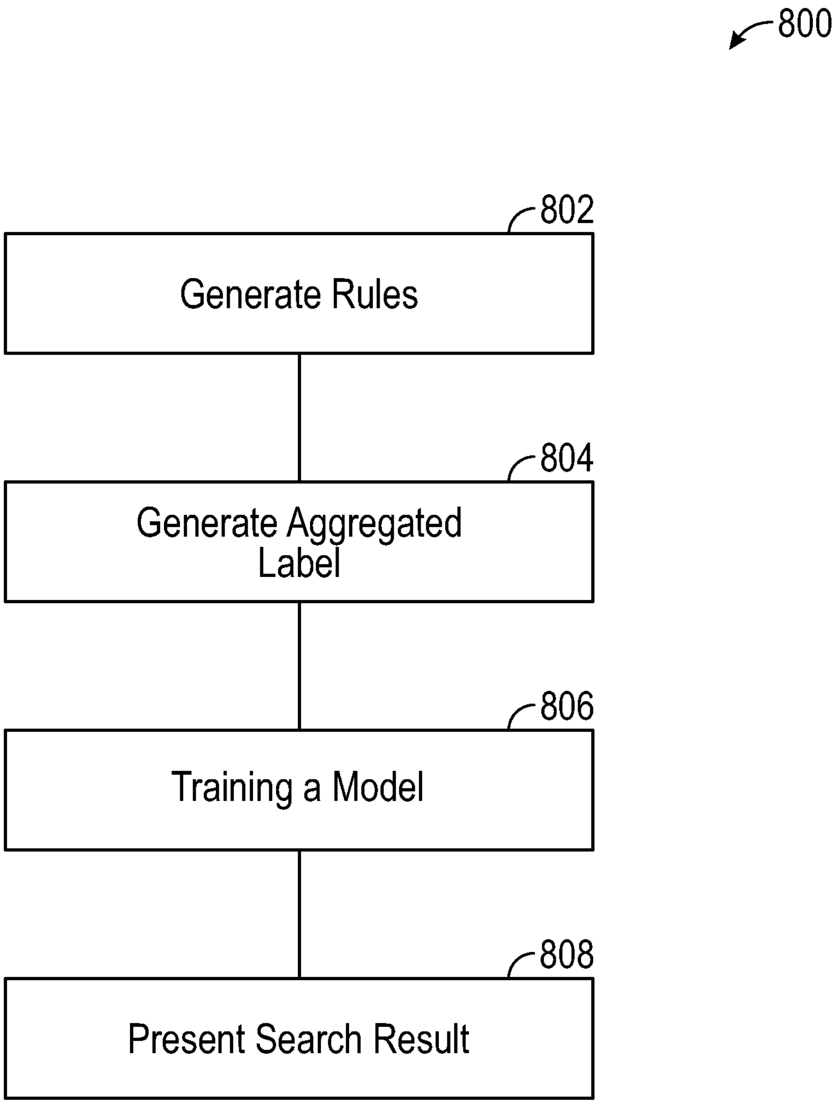
FIG. 8 is a flowchart of a method for labeling datasets according to some example embodiments.

FIG. 8 is a flowchart of a method 800 for labeling datasets. While the various operations in this flowchart are presented and described sequentially, one of ordinary skill will appreciate that some or all of the operations may be executed in a different order, be combined or omitted, or be executed in parallel.

Operation 802 is for generating, by one or more processors on two or more distributed systems, a plurality of rules for labeling data records within a dataset. The rules indicate the extent to which a corresponding data record matches one or more explicit or implicit query criteria. The rules include, for example labeling functions (LFs) as described earlier herein with respect to operation 464 (FIG. 4).

From operation 802, the method 800 flows to operation 804 for generating, by the one or more processors, an aggregated label for the corresponding data record based on the plurality of rules. The aggregation of operation 804 includes, for example, aggregation as described earlier herein with respect to operation 468 (FIG. 4).

From operation 804, the method 800 flows to operation 806 for training a model using the dataset and the aggregated label.

From operation 806, the method 800 flows to operation 808 for causing presentation, by the one or more processors, of a user interface (UI) for presenting a search result including one or more data records of a dataset. The dataset here need not be the dataset the model is trained on. In some embodiments, the dataset from which data records are presented can be a different, but similar dataset. The two datasets are similar in the sense that the second dataset might have jobs, queries or users similar to what we encountered in the first dataset (the training data). The model learns to generalize from the training data and produces scores for the scoring data (the second dataset).

Another general aspect is for a system that includes a memory comprising instructions and one or more computer processors. The instructions, when executed by the one or more computer processors, cause the one or more computer processors to perform operations comprising the operations described above.

In yet another general aspect, a machine-readable storage medium (e.g., a non-transitory storage medium) includes instructions that, when executed by a machine, cause the machine to perform operations comprising the operations described above Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A computer-implemented method for labeling datasets, the method comprising:

receiving, by one or more computer processors, a query from a user device;

retrieving, by the one or more computer processors, a set of results from a database based on the query;

joining, by the one or more computer processors, the set of results with fields from external data sources external to the database;

generating, by the one or more processors, a plurality of labeling functions based on fields of the set of results, fields of the query, and fields of the external data sources, wherein a labeling function includes a rule for evaluating whether a result of the set of results is a false positive response to the query;

aggregating, by the one or more computer processors, the plurality of labeling functions to generate an aggregated label for the set of results that indicates an extent to which a result of the set of results is a false positive response to the query, wherein the plurality of labeling functions are aggregated according to a weighted sum that includes a first term for each labeling function that evaluates the extent to which the respective labeling function accurately labels positives and a second term for each labeling function that evaluates the extent to which the respective labeling function accurately labels negatives;

training a model, by the one or more computer processors and using the labeling functions, to generate labels for labeling additional data of the external data sources; and providing, by the one or more computer processors, a result of the set for display on the user device when a value for a corresponding aggregated label is above a threshold.

2. The method of claim 1, further comprising:

generating weak labels based on one or more of the labeling functions, the weak labels providing a numeric value representative of the extent to which data of the external data sources is an appropriate response to the query; and training a model, using the weak labels and the labeling functions, to generate labels for labeling additional data of the external data sources.

3. The method of claim 1, wherein the rule generates a value indicating that insufficient information is available to determine whether a corresponding result is appropriate to the query.

4. The method of claim 1, further comprising learning weights corresponding to the weighted sum using a neural network.

5. The method of claim 1, further comprising learning weights corresponding to the weighted sum using online experiments.

6. The method of claim 1, wherein the database includes job listings.

7. The method of claim 1, further comprising:

receiving an indication of user engagement over a communication interface from a client device and using the indication to train a machine learning model to predict accuracy of additional labeling functions.

8. The method of claim 1, wherein the aggregated label is generated based on a logical OR of values returned by the plurality of labeling functions.

9. A system comprising:

a memory comprising instructions;

one or more databases for storing training data and data external to the training data;

a communication interface to a user device; and one or more computer processors, wherein the instructions, when executed by the one or more computer processors, cause the system to perform operations comprising:

receiving a query from the user device;

retrieving a set of results from a database based on the query;

joining the set of results with fields from external data sources external to the database;

generating, by one or more processors, a plurality of labeling functions based on fields of the set of results, fields of the query, and fields of the external data sources, wherein a labeling function includes a rule for evaluating whether a result of the set of results is a false positive response to the query;

aggregating the plurality of labeling functions to generate an aggregated label for the set of results that indicates an extent to which a result of the set of results is a false positive response to the query, wherein the plurality of labeling functions are aggregated according to a weighted sum that includes a first term for each labeling function that evaluates the extent to which the respective labeling function accurately labels positives and a second term for each labeling function that evaluates the extent to which the respective labeling function accurately labels negatives;

training a model, using the labeling functions, to generate labels for labeling additional data of the external data sources; and providing a result of the set for display on the user device when a value for a corresponding aggregated label is above a threshold.

10. The system of claim 9, wherein the operations further comprise:

generating weak labels based on one or more of the labeling functions, the weak labels providing a numeric value representative of the extent to which data of the external data sources is an appropriate response to the query; and training a model, using the weak labels and the labeling functions, to generate labels for labeling additional data of the external data sources.

11. The system of claim 9, wherein the rule generates a value indicating that insufficient information is available to determine whether a corresponding result is appropriate to the query.

12. The system of claim 10, further comprising learning weights corresponding to the weighted sum using a neural network.

13. The system of claim 9, wherein the operations further comprise:

receiving an indication of user engagement over a communication interface from a client device and using the indication to train a machine learning model to predict accuracy of additional labeling functions.

14. A tangible machine-readable storage medium including instructions that, when executed by a machine, cause the machine to perform operations comprising:

receiving a query from a user device;

retrieving a set of results from a database based on the query;

joining the set of results with fields from external data sources external to the database;

generating, by one or more processors, a plurality of labeling functions based on fields of the set of results, fields of the query, and fields of the external data sources, wherein a labeling function includes a rule for evaluating whether a result of the set of results is a false positive response to the query;

aggregating the plurality of labeling functions to generate an aggregated label for the set of results that indicates an extent to which a result of the set of results is a false positive response to the query, wherein the plurality of labeling functions are aggregated according to a weighted sum that includes a first term for each labeling function that evaluates the extent to which the respective labeling function accurately labels positives and a second term for each labeling function that evaluates the extent to which the respective labeling function accurately labels negatives;

training a model, using the labeling functions, to generate labels for labeling additional data of the external data sources; and providing a result of the set for display on the user device when a value for a corresponding aggregated label is above a threshold.

15. The tangible machine-readable storage medium of claim 14, further comprising:

generating weak labels based on one or more of the labeling functions, the weak labels providing a numeric value representative of the extent to which data of the external data sources is an appropriate response to the query; and training a model, using the weak labels and the labeling functions, to generate labels for labeling additional data of the external data sources.

16. The tangible machine-readable storage medium of claim 14, wherein the operations further comprise:

receiving an indication of user engagement over a communication interface from a client device and using the indication to train a machine learning model to predict accuracy of additional labeling functions.

* * * * *